April 6, 1954  J. MAHLER  2,674,156
ARRANGEMENT AND METHOD FOR VIEWING A PAIR
OF POLARIZED IMAGES TO ELIMINATE GHOSTS
Filed April 12, 1950  2 Sheets-Sheet 1

INVENTOR
JOSEPH MAHLER
BY
Louis L. Gagnon
ATTORNEY

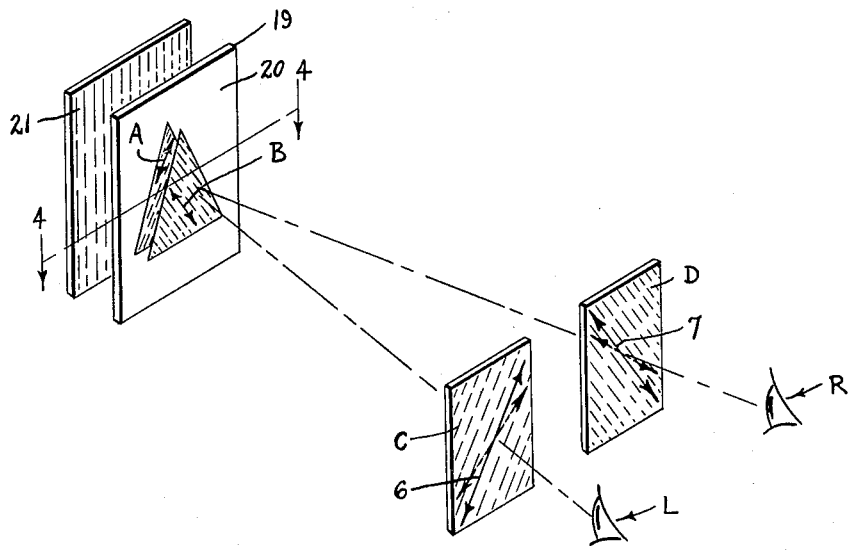
*Fig.* 3
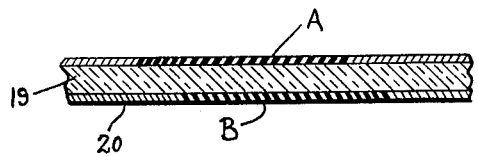
*Fig.* 4

Patented Apr. 6, 1954

2,674,156

UNITED STATES PATENT OFFICE 2,674,156

ARRANGEMENT AND METHOD FOR VIEWING A PAIR OF POLARIZED IMAGES TO ELIMINATE GHOSTS

Joseph Mahler, Southport, Conn., assignor to American Optical Company, Southbridge, Mass., a voluntary association of Massachusetts Application April 12, 1950, Serial No. 155,420

10 Claims. (Cl. 88—29)

This invention relates to improvements in devices for producing three-dimensional pictures and relates more particularly to improvements in devices of this nature wherein the three-dimensional effect is obtained through the use of superimposed light-transmitting stereoscopic picture portions or patterns each having controlled light-polarizing characteristics which are such that when viewed through light-polarizing analyzers, the three-dimensional effect is obtained.

In producing stereoscopic pictures of the above nature, great difficulty has been encountered in having a ghost image of the picture pattern intended for one eye visible to the other eye, and vice versa, when the eyes are viewing their respective image or picture portions through light-polarizing analyzers.

The above defect is particularly prevalent when viewing superimposed polarized colored picture-producing portions wherein the polarizing characteristics and the differently related colors are produced through the use of dichroic dyes.

Although very pleasing colored stereoscopic pictures are obtainable through the use of such dichroic dyes, the so-called ghost images set forth above have been such as to render them undesirable.

One of the principal objects, therefore, of the present invention is to provide an arrangement whereby such ghost images may be effectively eliminated.

Another object is to provide a system of the above character with means for causing the field surrounding the picture portions to be of substantially the same density as said ghost images whereby the visibility of said images are effectively eliminated and the overall three-dimensional stereoscopic effect is greatly increased.

Another object is to provide means for the elimination of such ghost images either when the stereoscopic picture portions are viewed directly or by projecting them on a screen to be viewed through analyzing means of the above character.

Other objects and advantages of the invention will become apparent from the following description taken in connection with the accompanying drawing and it will be apparent that many changes may be made in the details of construction, arrangement of parts and steps of the method shown and described without departing from the spirit of the invention as expressed in the accompanying claims.

I, therefore, do not wish to be limited to the exact details of construction, arrangement of parts and steps of the method shown and described as the preferred forms only have been given by way of illustration.

Referring to the drawings:

Fig. 3 is a diagrammatic view illustrating another embodiment of the invention; and Fig. 4 is an enlarged diagrammatic sectional view of the image producing means of the invention.

Figure 1:
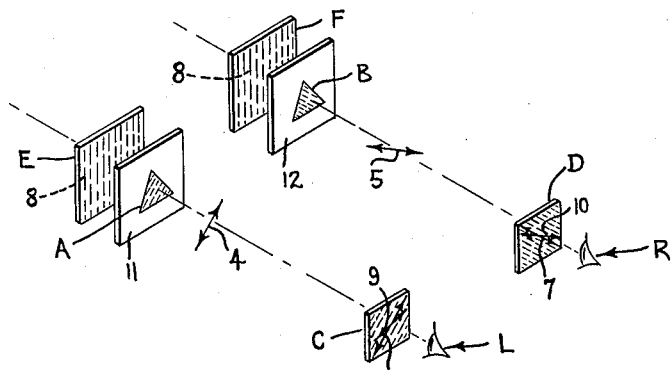
Fig. 1 is a diagrammatic view illustrating the essence of the invention.

Referring more particularly to the drawings wherein like characters of reference designate like parts throughout the several views, although the means for producing the light polarizing image or picture portions in accordance with the present invention are, in all instances, positioned in superimposed offset relation with each other and are of the type through which light is projected in order to render said portions visible, for ease of explanation, as shown in Fig. 1, the said image or picture portions for the respective eyes are separated from each other. In this figure the portion A is to be viewed by the left eye and the portion B by the right eye through suitable analyzers C and D, each positioned before its respective eye. The portion A is produced by light polarized in the direction indicated by the arrow 4 and the portion B is produced by light polarized in the direction of the arrow 5. The arrows, therefore, indicate the axes of polarization and are normally at a 90° relation with each other. The analyzer C has its axis of polarization in the direction indicated by the arrow 6 which, in normal practice, is parallel with the arrow 4 or axis of polarization of portion A. The analyzer D has its axis, indicated by the arrow 7, parallel with the arrow 5 or axis of polarization of portion B. This arrangement, when the dichroism of the polarizing crystals is of a high order, such as obtained through the use of an iodine-iodide solution in oriented molecules in a matrix of certain plastics such as polyvinyl alcohol for producing black and white portions such as portions A and B, would cause the portion A to be visible only to the left eye L and the portion B to be visible only to the right eye R.

The light polarizing characteristics, however, which may be obtained through the use of dichroic dyes and which are essential in producing light polarizing colored image or picture portions, do not have the high order of dichroism such as obtained by the iodine-iodide solution set forth above, and, therefore, the portion A, while being readily visible to the left eye L through the analyzer C, will also cause a so-called ghost image to be visible to the right eye R through the analyzer D. A similar effect takes place as regards the portion B.

These so-called ghost images have a decided detrimental effect upon the resultant stereoscopic impression received by the observer and have been one of the major drawbacks in producing such devices in the past. The present invention, therefore, while obtaining the desired stereoscopic effect in a manner similar to that set forth above, eliminates the ghost images through the use of polarizing means whose function is similar to that of placing light polarizing means E and F on the side of the image or picture producing portions A and B opposite that of the eyes of the observer. The light polarizing means E and F have their axes of polarization disposed vertically as indicated by the dash lines 8 or may have their axes positioned horizontally as desired. It is important, however, that the axes of both of said polarizing means E and F be effectively in the same direction or parallel and are held in said relation with respect to the picture producing portions A and B.

With this latter arrangement, in order to obviate the so-called ghost images such as described above, the axes of polarization of the respective analyzers C and D must be altered, that is slightly shifted or rotated from their normal position of use, as indicated by the arrows 9 and 10. This altering or shifting is only sufficient to cause the light passing through the fields 11 and 12 surrounding the portions A and B, and which is now polarized by the light polarizing means E and F, to be varied in density by an amount sufficient to match the density of the ghost images and thereby render said images invisible to the observer.

Figure 2:
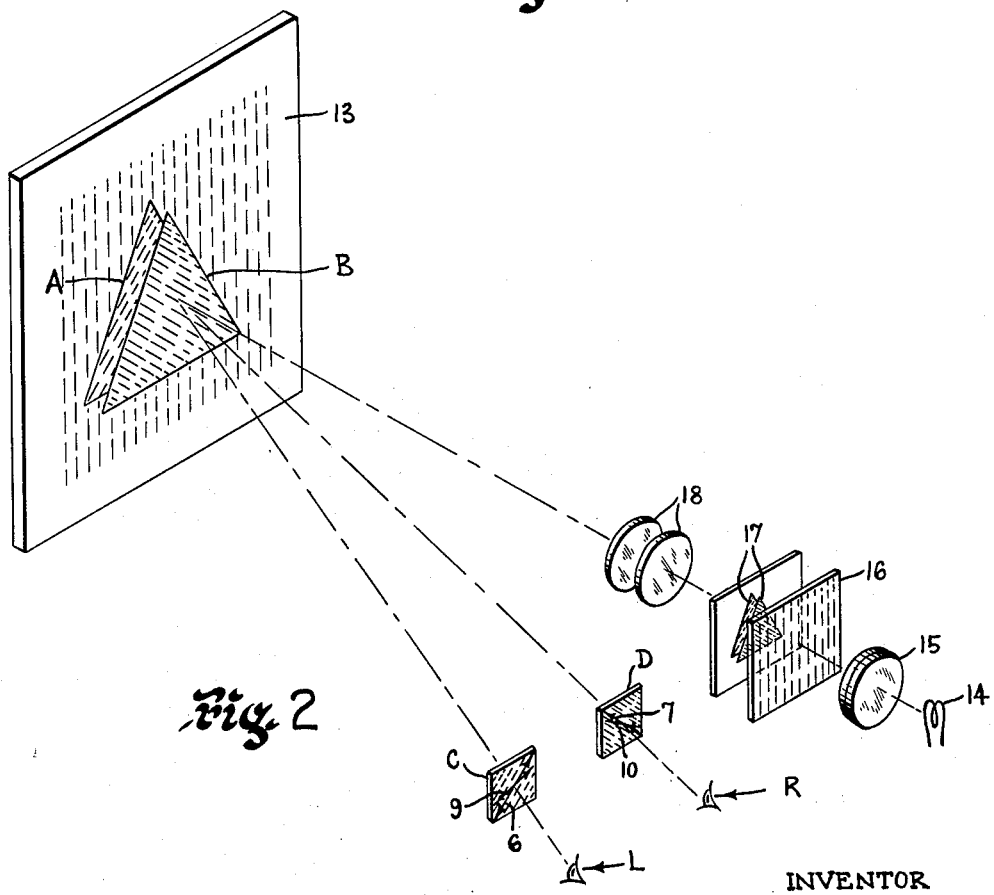
Fig. 2 is a diagrammatic view illustrating one embodiment of the invention.

As stated above, although for ease of illustration the portions A and B have been shown as being separate from each other, it is to be understood that the said portions are in superimposed relation as diagrammatically illustrated in Figures 2, 3 and 4. In Fig. 2 the portions A and B are projected onto a suitable screen 13 having a metalized surface such as aluminum or other metal which will not depolarize the said image or picture portions. The picture portions A and B are produced by projecting light from a suitable source 14 through a suitable condenser lens system 15 and light polarizing means 16 which, in this instance, functions in a manner similar to the light polarizing means E and F described above. The light passing through the light polarizing means 16 thence passes through the picture producing slide 17 which, in this instance, is a suitable transparent sheet of plastic material such as polyvinyl alcohol having on one side thereof the means for producing the light polarized picture portion A and, on the other side thereof, the means for producing light polarized picture portion B; see Fig. 4. The nature of this slide is similar to that of the commercially known Vectograph film. Such Vectograph films may be formed in accordance with the teachings of Patent No. 2,203,687 issued June 11, 1940, to E. H. Land and Patent No. 2,289,714 issued July 14, 1942, to E. H. Land.

Although the light polarizing means 16 is shown separate from the image or picture producing means 17, it is to be understood that it may be placed directly in superimposed and laminated relation with said image or picture producing means, if desired. The picture forming portions are then projected by the objective 18 onto the screen 13.

When it is stated that the axes of the analyzers C and D are rotated in the direction of the position of the arrows 9 and 10, it is to be understood that this is in the case when the axis of polarization of the light polarizing means E and F are vertically disposed. However, if horizontally disposed, they must be rotated with respect to the normal axis indicated by the arrows 6 and 7 an amount sufficient to cause the areas 11 and 12 to be altered in density to equal that of the density of the ghost images. This is also true of the analyzers C and D illustrated in Fig. 2 wherein the field of the screen 13 surrounding the portions A and B will be polarized by the polarizing means 16.

In Fig. 3, there is illustrated an arrangement whereby the stereoscopic image or picture portions A and B are formed on the front and rear surfaces of a sheet of transparent material 19, as shown best in Fig. 4. The sheet 19 is preferably polyvinyl alcohol having the picture portions A and B produced by dichroic dyes in oriented molecules which not only introduce the polarizing characteristics desired but also the color. The field 20 surrounding the picture portions A and B is clear transparent and has no color or polarizing characteristics. The picture producing portions A and B are adapted to produce their desired stereoscopic effect when light passes therethrough and when the images are viewed through the analyzers C and D. Rearwardly of the sheet 19, there is a polarizing unit 21 which functions similar to the polarizers E and F described above and the analyzers C and D must be rotated from their normal axes as indicated by the lines 6 and 7 to a position whereby the field 20, which is now polarized by the light-polarizing sheet 21, will assume a density substantially equal to that of the ghost images referred to above and thereby effectively eliminate such images.

It is to be understood that Fig. 4 is merely a diagrammatic illustration of the characteristics of the picture-producing sheeting.

Although the axes 6 and 7 of the analyzers C and D must be rotated as specified above to vary the density of the field surrounding the picture-producing portions A and B by an amount sufficient to cause the ghost images to blend therewith and disappear, it is to be understood that the amount of rotation necessary to bring about this result, in most instances, is only slight and is never such as to have any appreciable effect upon the selective visibility of the portions A and B as viewed by the respective eyes L and R through the analyzers C and D. This is true in all instances and the direction of rotation of the analyzers is controlled according to the direction of orientation of the axis of the polarizing means 21, that is, whether the said axis is retained in a vertical or horizontal position with respect to the picture-producing portions A and B.

Although light-polarizing means having an order of transmission of approximately 40% of the visible rays may be used in the present invention, it is preferable and more desirable that the said means have a higher transmission, say a transmission upwardly to the order of 50 or 60% of the visible rays. In any event, the essence of the present invention is that of providing polarized light surrounding the image-forming portions A and B by which the surrounding field may be altered as to density to eliminate the so-called ghost images while having little, if any, effect upon the efficiency or visibility of the respective picture-forming portions A and B.

From the foregoing description, it will be seen that simple, efficient and economical means and method have been provided for accomplishing all of the objects and advantages of the invention.

Having described my invention, I claim:

1. The method of effectively obviating ghost images in stereoscopic devices of the type embodying light-polarizing image-forming portions having their axes of polarization substantially normal to each other and adapted to be viewed through light-polarizing analyzer means having their axes of polarization disposed in the general direction of the axes of polarization of the respective image-forming portions to be viewed therethrough, comprising superimposing with each of said image-forming portions a light polarized field having its axis of polarization angled with respect to the axes of polarization of the respective image-forming portions, and altering the axes of polarization of said analyzer means with respect to each other and from parallelism with the axis of the respective image-forming portion to be viewed therethrough by an amount sufficient to cause the density of said field to be substantially equal to the ghost images produced of the other image-forming portions whereby the said ghost images are rendered substantially invisible.

2. The method of effectively obviating ghost images in stereoscopic devices of the type embodying light-polarizing image-forming portions adapted to be viewed through light-polarizing analyzer means comprising arranging said light-polarizing image-forming portions in superimposed offset relation with each other with the axes of polarization of said images being substantially normal to each other, surrounding said image-forming portions with a light polarizing field having its axis of polarization angled with respect to the axes of polarization of said image-forming portions and supporting before each eye of an observer light-polarizing analyzer means each having its axis of polarization disposed in the general direction of the respective image-forming portion to be viewed by said eye and altering the related axes of polarization of the analyzer means from parallelism with the axis of the respective image-forming portion to be viewed therethrough by an amount sufficient to cause the density of the field to be substantially equal to that of the ghost images whereby said ghost images are rendered substantially invisible and a more clearly defined single image is seen by each eye of the observer.

3. An arrangement of the character described comprising a target having slightly offset superimposed light polarizing image-forming areas with their axes of polarization disposed substantially normal to each other, means for surrounding said areas with a field of light polarized at an angle different from that of said image-forming areas of the target with the angle of difference between the axis of said field and the axis of each of said image-forming areas being substantially the same, and a pair of light polarizing analyzers, one for each respective eye of the observer when viewing the target, said analyzers being spaced from the target and each having its axis of polarization disposed in the general direction of the axis of polarization of the respective image-forming area to be viewed through said analyzer to permit viewing of one of the image-forming areas through each of the analyzers and while obtaining a faint image of the image-forming area intended to be viewed only through the other analyzer, the axis of polarization of said analyzers being slightly offset from parallelism with respect to the axis of polarization of the respective image-forming area by an amount sufficient to cause the density of the field surrounding said image-forming area to be substantially equal to the density of said faint image of the other image-forming area to cause said faint images to blend with the surrounding field and become substantially indiscernible whereby only one of said image-forming areas is seen through each analyzer.

4. An arrangement of the character described comprising a target having slightly offset superimposed light polarizing image-forming areas with their axes of polarization disposed substantially normal to each other, means for providing a field of light overlying said areas and polarized at an angle different from that of said image-forming areas of the target with the angle of difference between the axes of said field and the axis of each of said image-forming areas being substantially the same, and a pair of light polarizing analyzers, one for each respective eye of the observer when viewing the target, said analyzers being spaced from the target and each having their axis of polarization disposed in the general direction of the axis of polarization of the respective image-forming area to be viewed through said analyzer to permit viewing of one of the image-forming areas through each of the analyzers and while obtaining a faint image of the image-forming area intended to be viewed only through the other analyzer, the axis of polarization of said analyzers being slightly offset from parallelism with respect to the axis of polarizaton of the respective image-forming area to be viewed therethrough by an amount sufficient to cause the density of the field outside the image-forming area intended to be viewed through said analyzer to be substantially equal to the density of said faint image of the other image-forming area to cause said faint images to blend with the surrounding field and become substantially indiscernible to an observer's eye viewing the target through said analyzer whereby only one of said image-forming areas is seen through each analyzer.

5. An arrangement of the character described comprising a sheet of transparent material having light-polarizing image-forming portions in superimposed and slightly offset relation with each other and means for producing a field of polarized light surrounding said image-forming portions, the axis of polarization of the respective image-forming portions being substantially normal to each other and the axis of polarization of the field being at an angle different from that of the axes of said image-forming portions and a pair of analyzers, one for each eye of an observer and located at the position for viewing the images produced by said image-forming portions, the axis of polarization of each analyzer being disposed in the general direction of the axis of polarization of the respective image to be viewed through said analyzer to permit said image to be viewed while obtaining a faint image of the other image-forming portion, said axis of polarization of each analyzer being slightly offset from parallelism with the axis of polarization of the image adapted to be viewed by said eye by an amount sufficient to permit viewing of said image but causing the density of the field surrounding said image to be substantially equal to the density of the faint image of the other image-forming portion whereby said faint image becomes substantially indiscernible.

6. An arrangement of the character described comprising a source of illumination, image-forming portions having light-polarizing characteristics in slightly offset relation with each other positioned in alignment with said illumination and means for producing a field of polarized light surrounding said image-forming portions, the axis of polarization of the respective image-forming portions being substantially normal to each other and the axis of polarization of the field being at an angle different from that of the axes of said image-forming portions, and a pair of analyzers, one for each eye of an observer, positioned for viewing said images produced by said image-forming portions, the axis of polarization of each analyzer being disposed in the general direction of the axis of polarization of the image to be viewed therethrough by a respective eye to permit viewing of said image and obtaining a faint image of the other image-forming portion, the said axes of polarization of the respective analyzers varying from parallelism with the axes of the respective image-forming portion sufficient to increase the density of the field surrounding the desired image to cause the faint image of the other image-forming portion to blend with said surrounding field and become substantially indiscernible.

7. An arrangement of the character described comprising a screen, means for projecting a beam of light on said screen, a sheet of transparent material having light-polarizing image-forming portions in superimposed and slightly offset relation with each other and means for providing a light-polarizing field surrounding said image portions, said sheet being positioned in said beam and adapted to produce light-polarized images and a light-polarized field on said screen, the axis of polarization of the respective image portions being substantially normal to each other and the axis of polarization of the field being at an angle different from that of the axes of said image portions and a pair of analyzers, one for each respective eye of an observer and spaced from said screen for use in viewing said image portions, the axis of polarization of each analyzer being disposed in the general direction of the axis of polarization of the image to be viewed through said analyzer to permit viewing of said image and obtaining a faint image of the other image-forming portion, said axis of polarization of the analyzer varying from substantially parallel relation with the axis of polarization of the respective image by an amount sufficient to increase the density of the field surrounding the desired image to cause the faint image to be blended therewith and rendered substantially indiscernible.

8. The method of effectively obviating ghost images in stereoscopic devices of the type embodying a pair of superimposed light polarizing images arranged in offset relation and having their axes of polarization substantially normal to each other, and a pair of light polarized analyzers for viewing said images, one for each eye of the viewer, comprising the steps of surrounding said images with a light polarizing field having its axis of polarization angled with respect to the axes of polarization of said images by substantially equal amounts, and axially rotating said analyzers so as to locate their axes offset from parallelism with the axes of respective images to be viewed therethrough by an amount only sufficient to increase the density of the surrounding field to that of the ghost images produced of the other image whereby a more clearly defined image free of ghost images is seen by each of the two eyes of the observer through the respective analyzers.

9. An arrangement of the character described comprising a screen, means for projecting a beam of light on said screen, a transparent member having light-polarizing image-forming portions in superimposed and slightly offset relation with each other positioned in said beam and adapted to produce light-polarized images on said screen, light polarizing means positioned in said beam adapted to simultaneously produce a light polarized field on said screen surrounding the said slight polarized images, the axis of polarization of the respective image portions being substantially normal to each other and the axis of polarization of the field being at an angle different from that of the axes of said image portions, and a pair of analyzers, one for each respective eye of an observer and spaced from said screen for use in viewing said image portions, the axis of polarization of each analyzer being disposed in the general direction of the axis of polarization of the image to be viewed through said analyzer to permit viewing of said image and obtaining a faint image of the other image-forming portion, said axis of polarization of each analyzer varying from substantially parallel relation with the axis of polarization of the respective image by an amount sufficient to increase the density of the field surrounding the desired image to cause the faint image to be blended therewith and rendered substantially indiscernible.

10. A light polarizing stereoscopic device comprising a pair of layers of transparent material arranged in superimposed relation, a dichroic dyed polarizing image in each transparent layer, said images being stereoscopic complements of each other, said polarizing images having their polarizing axes at approximately right angles to each other, and a further transparent light polarizing layer superimposed on said transparent layers and having its axis of polarization disposed at an angle substantially midway between the axes of the polarizing images.

References Cited in the file of this patent

UNITED STATES PATENTS

| Number | Name | Date |
|---|---|---|
| 1,879,793 | Chubb | Sept. 27, 1932 |
| 1,885,642 | Strong | Nov. 1, 1932 |
| 2,165,974 | Land | July 11, 1939 |
| 2,206,303 | Neumueller | July 2, 1940 |
| 2,281,101 | Land | Apr. 28, 1942 |
| 2,289,714 | Land | July 14, 1942 |
| 2,458,437 | Smith | Jan. 4, 1949 |